Figure 1:
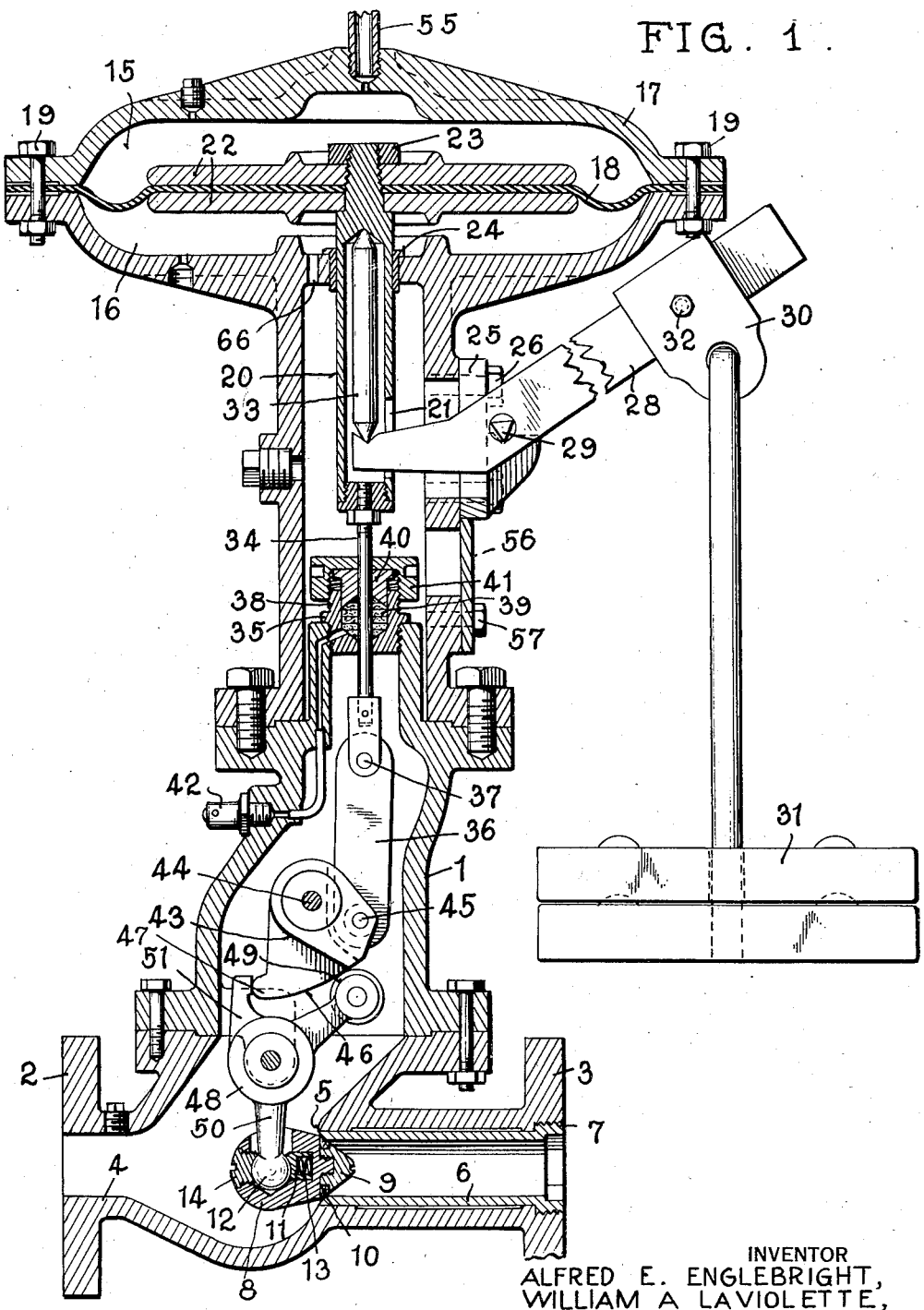
Figure 1:

Nov. 12, 1935.   A. E. ENGLEBRIGHT ET AL   2,021,053
FLUID PRESSURE REGULATION SYSTEM
Filed Aug. 22, 1932   3 Sheets-Sheet 1

INVENTOR
ALFRED E. ENGLEBRIGHT,
WILLIAM A. LAVIOLETTE,
BY
 ATTORNEYS

Nov. 12, 1935.  A. E. ENGLEBRIGHT ET AL  2,021,053
FLUID PRESSURE REGULATION SYSTEM
Filed Aug. 22, 1932   3 Sheets-Sheet 2
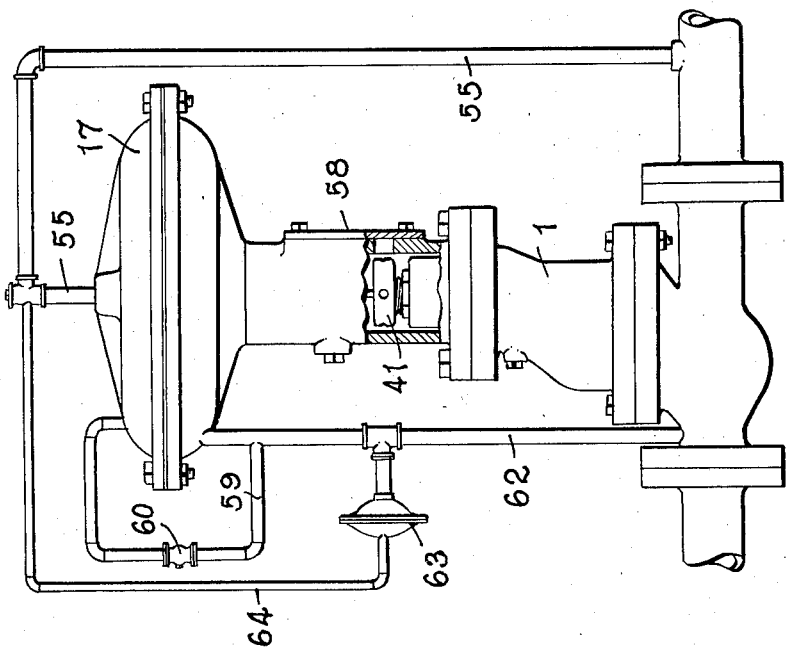
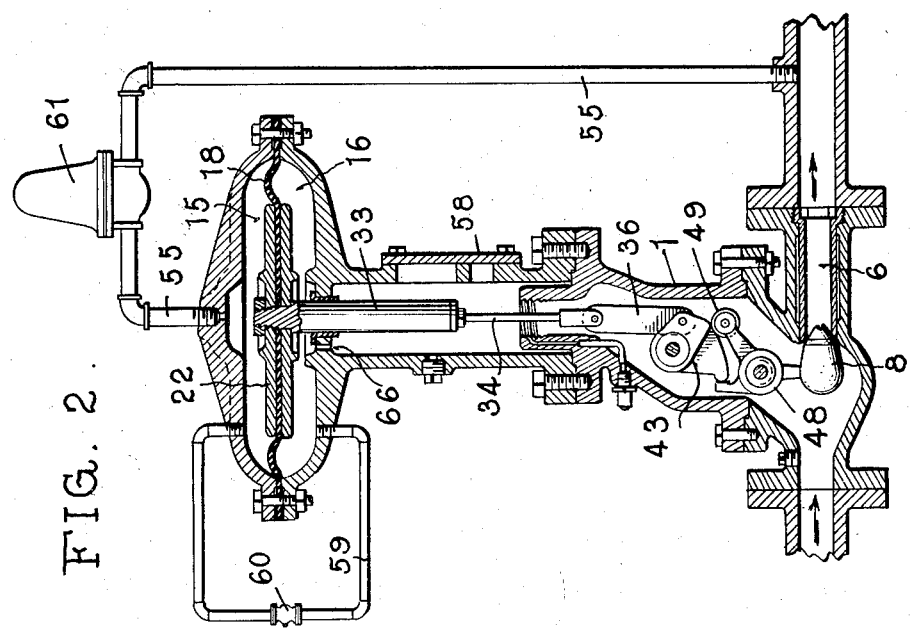
INVENTOR
ALFRED E. ENGLEBRIGHT,
WILLIAM A. LA VIOLETTE,
BY
Stone Boyden Mack & Hahn ATTORNEYS Nov. 12, 1935.  A. E. ENGLEBRIGHT ET AL  2,021,053
FLUID PRESSURE REGULATION SYSTEM
Filed Aug. 22, 1932   3 Sheets-Sheet 3
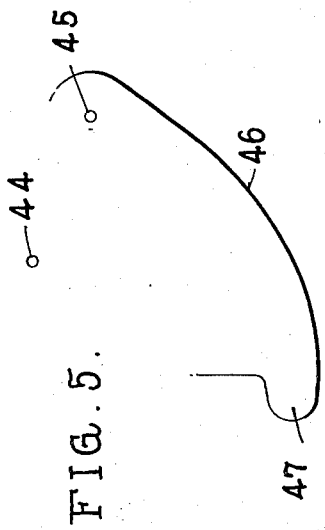
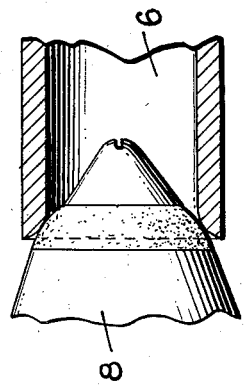
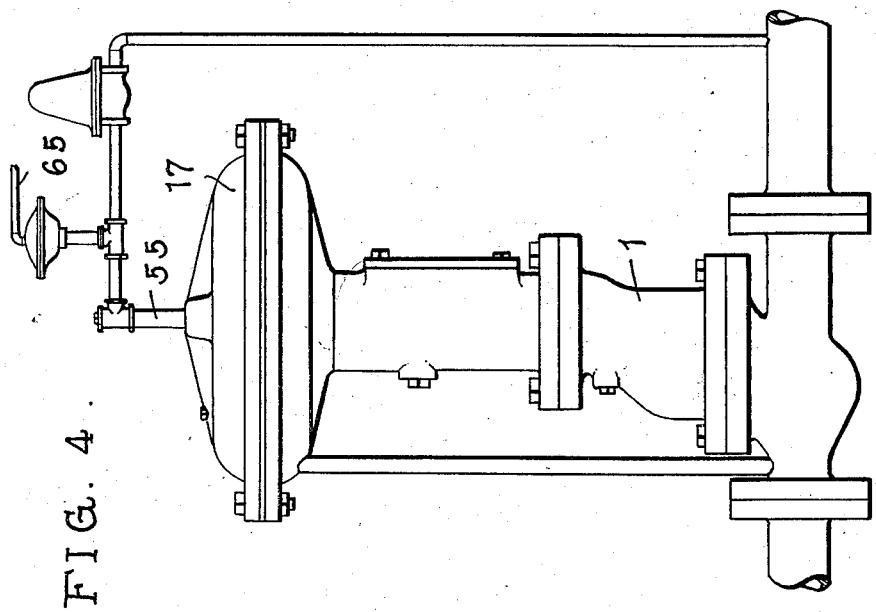
INVENTORS
ALFRED E. ENGLEBRIGHT,
WILLIAM A. LAVIOLETTE,
BY
Stone Boyden Mack & Hahn ATTORNEYS Patented Nov. 12, 1935

2,021,053

UNITED STATES PATENT OFFICE 2,021,053

FLUID PRESSURE REGULATION SYSTEM

Alfred Eugene Englebright, San Rafael, and William A. La Violette, Sausalito, Calif.

Application August 22, 1932, Serial No. 629,960

6 Claims. (Cl. 137—153)

This invention relates to fluid pressure systems and the regulation thereof.

More particularly, it relates to that type of fluid pressure system in which a relatively high variable fluid pressure is reduced to deliver a relatively low uniform pressure.

It relates to the valves and valve assemblies which are required to reduce pressure and which will give a most satisfactory and uniform low pressure irrespective of fluctuations of the fluid pressure to be reduced.

As is well known, such apparatus as this is used in many applications such as in illuminating gas distribution systems, steam delivery systems, as well as many fluid fuel feeding systems and other well known uses.

It is an object of this invention to provide a valve which may be used in a fluid pressure system and which will give a more satisfactory and uniform outlet pressure under widely varying pressure conditions on the inlet side of the system; which will tend to eliminate chattering and vibration of the valve and which will perform more satisfactorily under wide variations of demand on the outlet side of the system.

Another object of the invention is to provide a valve which may be used by itself for regulating pressure and which may also be converted so that it may be used in combination with a pilot valve having fluid pressure balancing means substituted for the weight counterbalancing.

It is also an object of this invention to provide novel fluid pressure systems embodying this new regulator valve in combination with the ordinary pilot valves well known in the art.

It has always been an object in designing fluid pressure valves to provide a balanced valve mechanism which requires a minimum of force required to open and close the valve. The valves of the prior art which do not embody this balanced valve principle suffered from the defect that those having a valve plug opening against the flow of fluid required a maximum force to commence the opening operation, which force rapidly diminished as the valve was opened wider. Likewise, in those having a valve plug opening with or in the same direction as the flow of the fluid, a maximum of force was required to close the valve completely and proper and adequate seating of the valve was almost impossible.

It is an object of this invention to provide a valve in which the valve plug opens against the flow through the valve so that the passage of the fluid constantly tends to close the valve. This force on the valve is minimized as much as possible by stream-lining the valve body.

The improved valve is operated by a cam of such curvature that the initial movement to open the valve is very slow and hence a uniform amount of force is required to move the valve to all positions.

The flow past the valve plug not only has a tendency to provide adequate and complete seating of the valve, and prevent leakage when the valve is closed, but also has a tendency to maintain a highly desirable tension on the working parts of the valve at all times, thus taking up any lost motion which may result from wear to the various moving parts and joints.

Other and further objects of the invention become apparent from the following specification.

Figure 1 is a sectional view of the valve with counter balancing weights used to balance the fluid pressure in the diaphragm chamber, Figure 2 is a view of the valve system using a pilot valve in combination with the improved regulator for bleeding off the fluid pressure from the upper diaphragm chamber to the discharge side of the system, Figure 3 is a view of a valve system using a pilot valve in combination with the improved regulator, arranged to permit the use of a relatively low pressure on both sides of the diaphragm in the diaphragm chamber, Figure 4 illustrates a fluid pressure system which is adapted to be used where two separate control systems are desirable, and, Figure 5 illustrates a detailed view of the valve actuating cam.

Figure 6 illustrates a detailed view of the valve body and packing ring seating against the valve seat.

With more particular reference to the drawings, 1 is a valve casing having an inlet opening 2 for reception of the relatively high pressure fluid and an outlet opening 3 for the discharge of the low pressure fluid.

A straight flow passage 4 is provided between these openings and a valve seat 5 is mounted in the flow passage approximately half-way between the inlet and outlet openings. The valve seat preferably comprises a tubular member 6 removably mounted in the casing 1 by means of screw threads 7 to permit its easy insertion and removal in case replacement becomes necessary.

The valve plug 8 is of stream line form in order to offer a minimum of resistance to the passage of fluids through the flow passage. This valve plug has its rear end formed with a tapering screw cap 9

9 which forms an annular channel around the valve plug and carries a packing strip 10 of annular form in the channel adapted to seat against the valve seat 5. The valve plug is secured to its operating arm by means of a ball and socket joint. The socket of the joint carried by the valve plug may comprise a pair of ball engaging members having surfaces adapted for engaging the ball 12 of the operating arm. One of these members 11 is preferably mounted in a cylindrical aperture in the plug and pressed forward by means of a spring 13. The other of these members 14 is preferably screw-threaded into the body of the valve plug and engages the opposite side of the ball 12, permitting adjustment of the joint.

It will be apparent that the plug is of such shape and so mounted in the flow passage that the passage of fluid through the flow passage past the valve plug will tend to keep the valve plug centered with respect to the valve seat. The ball and socket connection between the valve plug and its operating arm will permit free movement of the valve plug in any transverse direction.

As shown in Fig. 6, the packing member 10 has a bulging surface adapted to contact the valve seat 5 and the valve seat 5 is also somewhat convex so that a line contact between these two members will occur when the valve plug is seated on the valve seat, regardless of whether it is perfectly centered thereon or not.

In the upper end of the casing 1 is a diaphragm chamber. This chamber is formed by the casing 1 forming the lower half and a casing cap 17 forming the upper half and has a flexible diaphragm 18 extending across substantially the center of the chamber dividing the chamber into two separate gas-tight chambers 15 and 16. The outer edge of said diaphragm is clamped between the casing 1 and the casing cover 17 by means of a plurality of bolts such as 19 to form a gas tight joint. Secured to the diaphragm is a cylindrical operating rod 20, the lower portion thereof being hollow and having a slot 21 in the side to permit entry of the counterbalance arm. This operating rod 20 is preferably secured to the diaphragm by means of a pair of plates 22 which are clamped on either side of the central portion of the diaphragm by means of the clamping nut 23 which is screw threaded on the upper end of the operating rod 20. The operating rod passes downward through the casing through a guide bushing 24 which is mounted in the casing proper and serves to keep the operating rod centered with respect to the diaphragm chamber.

Over an aperture in the side of the casing is a plate 25 secured by means of bolts 26 and having a pair of outwardly extending lugs 27. This plate 25 is provided with a slot to receive the counterbalance arm 28 which is pivotally mounted on the lugs 27 by means of the transverse knife edge 29. The outer end of the arm 28 carries a slidable member 30 from which are supported counter balancing weights 31. The slidable member 30 is secured to the arm by means of the set screw 32 which permits the adjustment of the distance of the member 30 from the fulcrum.

Within the hollow portion of the operating rod is a lift pin 33 having its upper end seated against the solid portion of the operating rod and its lower end seated on the inner end of the counter balance arm 28 which extends inwardly through the slot 21 in the side of the hollow portion of the operating rod. It will be seen that the weights 31 thus transmit to the operating rod 20 a direct vertical force which is considerably magnified depending upon the distance of the slidable member 30 from the fulcrum 29.

Secured to the lower end of the operating rod 20 is a connecting rod 34 which extends downwardly through the packing box 35 and connects with a connecting link 36 by means of a pivot pin 37. The packing box 35 through which this connecting rod extends, comprises a cylindrical main portion 38 adapted to hold packing material 39. The packing material is compacted against the connecting rod 34 by means of a telescoping member 40 forced down by a cap 41. The packing material in the box is supplied with suitable lubricant by means of a fitting such as 42. It is noted that the cap member 41 provides an additional seal to prevent passage of fluid through the packing box.

Pivotally mounted in the casing adjacent the lower end of the connecting link 36 is a cam member 43. This cam member 43 is mounted on a pivot pin 44 and is pivotally connected by means of a pin 45 to the connecting link 36. Thus reciprocatory movement of the connecting link 36 such as is caused by movement of the flexible diaphragm will cause rotation of the cam member. This cam member has a face 46 having at its terminus a stop abutment 47, the function of which is described below.

Mounted beneath the cam member in the casing is a bell crank 48, one arm of which carries a roller 49 adapted for engagement with the face of the cam 43, the other arm 50 of which carries the ball 12 on which is mounted the valve plug as described above. A limit stop 51 is formed integrally with the bell crank arm and is adapted to engage the abutment 47 when the valve is improperly seated due to some obstruction. This situation would mean that the bell crank would be hung up and the roller 49 would not be in contact with the face of the cam 46, and the regulator would not close any further were it not for the abutment 47 on the cam striking the stop 51.

The curvature of the cam member 43 is such that vertical movement of the operating rod causes a very gradual opening of the valve at first and gradually increases the rate of opening of the valve. Due to the pressure of the high pressure fluid, the resistance of the valve to opening is very great at first and gradually decreases as the valve is opened. The cam surface is so designed that a practically uniform tension on the vertical operating rod will be maintained as the valve is moved through all positions. In the casing cap 17 an outlet conduit 55 is provided which connects to the down stream or low pressure side of the system. Thus the downward pressure exerted on the diaphragm 18 is maintained at the same pressure as in the outlet side of the system.

Directly below the plate 25 in the casing is a second aperture covered by a plate 56 secured to the casing by means of bolts 57, the removal of which permits access to the cap nut 41 of the packing box.

When it is desired to convert the valve from a weight counter balanced type to one that is balanced by fluid pressure as shown in Fig. 2, plates 56 and 25 are removed, carrying with them the weights 31 and lever arm 28. The packing box 35 is removed to permit free flow of the gas from the inlet opening up through the interior of the valve. A plate 58 is bolted to the side of the casing covering the apertures formerly covered by plates 56 and 25 to prevent any escape of fluid through these apertures. A by-pass 59 is connected from an opening in the lower diaphragm chamber around the diaphragm and into the upper diaphragm chamber. This by-pass contains a valve 60 having a relatively restricted passage. A pilot valve 61 is inserted in the outlet line 55 between its connection with the casing and its connection with the outlet line.

An additional form of conversion is shown in Fig. 3. In this form the stuffing box 35 is retained and a conduit 62 is connected from the inlet side of the valve to the lower diaphragm chamber. A by-pass similar to the one described in connection with Fig. 2 is used to connect the upper and lower diaphragm chambers. A pilot valve 63 is connected in the conduit 62 and has control pipe 64 connecting with conduit 55 to the outlet side of the system.

The modification shown in Fig. 4 is used in some cases where it is desired to use two separate sources of control such as in fuel feeding systems for steam generators where it is desirable to control the feeding of the fuel not only by its outlet pressure but by the steam pressure in the boilers. In this case two pilot valves are connected in series in the conduit 55, one of the pilot valves having a control line 65 connecting to the steam pressure in the boiler. In this case it will be seen that normal outlet pressure will be maintained in the outlet side of the system only in case the steam pressure falls below a certain predetermined amount.

The operation of the valve is substantially as follows. The high pressure fluids enters through the inlet opening 4, filling the entire inlet chamber and extending up as far as the stuffing box 35. There being no pressure in the outlet side of the system, the weights 31 operating through the arm 28 and the lift pin 33 raises the diaphragm 18 carrying with it the operating rod 20 which revolves the cam member 43 about its pin 44. The rotation of this cam member having its face operating upon the roller 49 of the bell crank 48 draws the valve body 8 away from the valve seat 5 permitting the fluid to flow directly through the valve. It will be seen that the flow of the fluid passing the stream line valve body tends to keep this valve body centered with respect to its valve seat. As the fluid flows through to the outlet side of the system very rapidly pressure in the outlet side of the system is built up and conducted through the pipe 55 into the upper diaphragm chamber 15 and a downward force is exerted on the diaphragm 18. When this force is sufficient to balance the force exerted upwardly by the weights 31, the diaphragm 18 is forced downward, thus causing a reverse rotation of the cam 43 and permitting the flow pressure of the fluid passing through the valve to move the valve body 8 against its seat 5, thus closing the valve.

Adjustment of the amount of weight applied at 31 will positively control the pressure maintained in the outlet side of the system. It will be seen that in normal operation where a relatively constant amount of fluid is drained from the low pressure side of the system, the valve will be maintained in a partially open condition just sufficient to take care of the demand.

It will further be noted that the flow pressure passing through the valve exerts a constant pressure on the valve body 8 tending to close the same at all times. This force provides a constant tension upon all of the moving parts of the valve so that no looseness as result of wear will be developed.

The operation of the system shown in Fig. 2 is substantially the same except that fluid pressure means is substituted for the weight counter balances and the pilot valve is used in the outlet conduit 55. The incoming fluid under high pressure passes upward through the interior of the valve casing. The packing box having been removed, the fluid is permitted to pass upward through the aperture 66 adjacent the guide bushing 24 and into the lower diaphragm chamber 16. The fluid passes from the lower diaphragm chamber through the by-pass 59 through the restricted aperture 60 and into the upper diaphragm chamber.

The pilot valve 61 is of the well-known structure which permits the valve to open when the pressure on one side of the system is reduced beyond a predetermined amount. This is done customarily by means of a tension spring operating on a diaphragm. The pressure in the outlet side of the system being below normal, the pilot valve 61 is opened and bleeds away the fluid pressure in the upper side of the diaphragm more rapidly than it can be replaced due to the restricted aperture 60. This decrease in pressure on the upper side of the diaphragm while the pressure on the lower side of the diaphragm is maintained constantly equal to the pressure on the inlet side of the system causes the raising of the diaphragm and connected operating rod and a rotation of the cam member substantially the same as described in connection with Fig. 1, thus opening the valve 8. When the flow through the flow passage 4 to the outlet side of the system has built the pressure on the outlet side of the system up to the point determined by the adjustment of the pilot valve 61, the pilot valve will close. After the closing of the pilot valve, the fluid pressure passing through the restricted aperture 60 will build up the pressure in the upper diaphragm chamber to a point where it will balance the pressure in the lower diaphragm chamber. The balancing of these pressures will permit the mere weight of the parts to cause the diaphragm and associated operating rod to move downwardly thus permitting the valve 8 to close.

It will be noted in connection with all of these systems, that the pressure on the diaphragm from either side is always substantially the same and as a result of this the diaphragm will not be subjected to undue differential pressures thereby increasing its life.

In the system shown in Fig. 3 the stuffing box is retained in the weight counter balance valve. Fluid pressure entering the inlet opening passes upwardly through the conduit 62 to the pilot valve 63 which controls its admission into the lower diaphragm chamber. The by-pass 59 is substantially the same as that described in connection with Fig. 2. The pilot valve used in this system is of the conventional type which has a separate controlling conduit which may be connected to the low pressure side of the system by means of the pipe 64. When the pressure in the low pressure side of the system falls below the predetermined point, the pilot valve 63 automatically opens, building up a pressure on the lower side of the diaphragm 18, thus opening the main valve. When the pressure in the low pressure side of the system has been raised to the desired point, the pilot valve 63 will automatically close. The fluid pressure built up in the lower diaphragm chamber will be by-passed through the restricted aperture 60 to the upper diaphragm chamber until the pressure in these two chambers are balanced and the valve will be permitted to close.

In the modification shown in Figure 4, the outlet pipe 55 connecting the upper diaphragm chamber with the low pressure side of the system contains two pilot valves connected in series. One of these valves is controlled by the pressure in the outlet side of the main and the other is controlled from some other source. It will be seen that the main regulator valve will only be opened when the pressure in the outlet system has fallen below a given point and the pressure controlling the second pilot valve has fallen below its predetermined point.

It will be obvious from the foregoing that many modifications of those systems may be made without departing from the spirit of the invention.

What we claim is:—

1. A pressure controlled valve comprising a casing having a diaphragm chamber therein, a diaphragm extending thereacross and dividing said chamber into separate upper and lower diaphragm chambers, means for admitting fluid pressure to said upper diaphragm chamber, means operating on the lower side of said diaphragm for balancing said fluid pressure in said upper diaphragm chamber comprising weight counterbalances, and means whereby fluid pressure may be introduced into said lower diaphragm chamber as a substitute for said weight counterbalances.

2. A pressure controlled valve comprising a valve casing having a straight flow passage therethrough, a valve within said flow passage having a valve plug movable in the direction of the flow through said passage whereby said flow constantly tends to close said valve, a diaphragm chamber within said casing, a diaphragm extending across said diaphragm chamber, forming separate upper and lower diaphragm chambers, means for exerting fluid pressure on both sides of said diaphragm and means connecting said diaphragm and said valve plug whereby said pressure exerted on the lower side of said diaphragm also constantly tends to close said valve.

3. A pressure regulator valve comprising a casing having a diaphragm chamber therein, means for introducing fluid pressure into said diaphragm chamber, weight counterbalances for balancing said fluid pressure in said diaphragm chamber and means permitting the substitution of fluid pressure means for said weight counterbalances.

4. A pressure controlled valve comprising a valve casing having a straight flow passage therethrough, a valve within said flow passage having a valve plug movable in the direction of flow through said passage whereby said flow constantly tends to close said valve, a diaphragm chamber within said casing, a diaphragm extending across said diaphragm chamber forming separate upper and lower diaphragm chambers, means for exerting fluid pressure on both sides of said diaphragm and means comprising a cam for connecting said diaphragm and said valve plug whereby said pressure on the lower side of said diaphragm constantly tends to close said valve.

5. A pressure controlled valve comprising a valve casing having a straight flow passage therethrough, a valve within said flow passage having a valve plug movable in the direction of flow through said passage whereby said flow constantly tends to close said valve, a diaphragm chamber within said casing, a diaphragm extending across said diaphragm chamber forming separate upper and lower diaphragm chambers, means for exerting fluid pressure on both sides of said diaphragm and means comprising a cam of gradually increasing radius and a bell crank associated therewith connecting said diaphragm and said valve plug whereby a pressure differential in said diaphragm chambers serves to actuate said valve.

6. A pressure controlled valve comprising a valve casing having a straight flow passage therethrough, a valve within said flow passage having a valve plug movable in the direction of flow through said passage whereby said flow constantly tends to close said valve, a diaphragm chamber within said casing, a diaphragm extending across said diaphragm chamber forming separate upper and lower diaphragm chambers, means for exerting fluid pressure on both sides of said diaphragm and means responsive to a difference in pressure in said diaphragm chambers for actuating said valve plug.

ALFRED E. ENGLEBRIGHT.
WILLIAM A. LA VIOLETTE.